Aug. 23, 1949.　　D. S. STEVENS　　2,479,786
LIQUID FLOW GAUGE
Filed Oct. 24, 1945

Inventor
Daniel S. Stevens

Patented Aug. 23, 1949

2,479,786

UNITED STATES PATENT OFFICE 2,479,786

LIQUID FLOW GAUGE

Daniel S. Stevens, Chicago, Ill.

Application October 24, 1945, Serial No. 624,250

2 Claims. (Cl. 73—216)

This invention relates to a gauge for measuring the rate of flow of a liquid.

The principal object of this invention is to provide a simple means for an operator to judge the rate at which a liquid is flowing through a tubular system. A further object is to provide a device for measuring the flow which can be readily cleaned and sterilized in case aseptic conditions are required.

The novel features of my invention will be understood from a description of the drawings, of which:

Figures 1, 2:
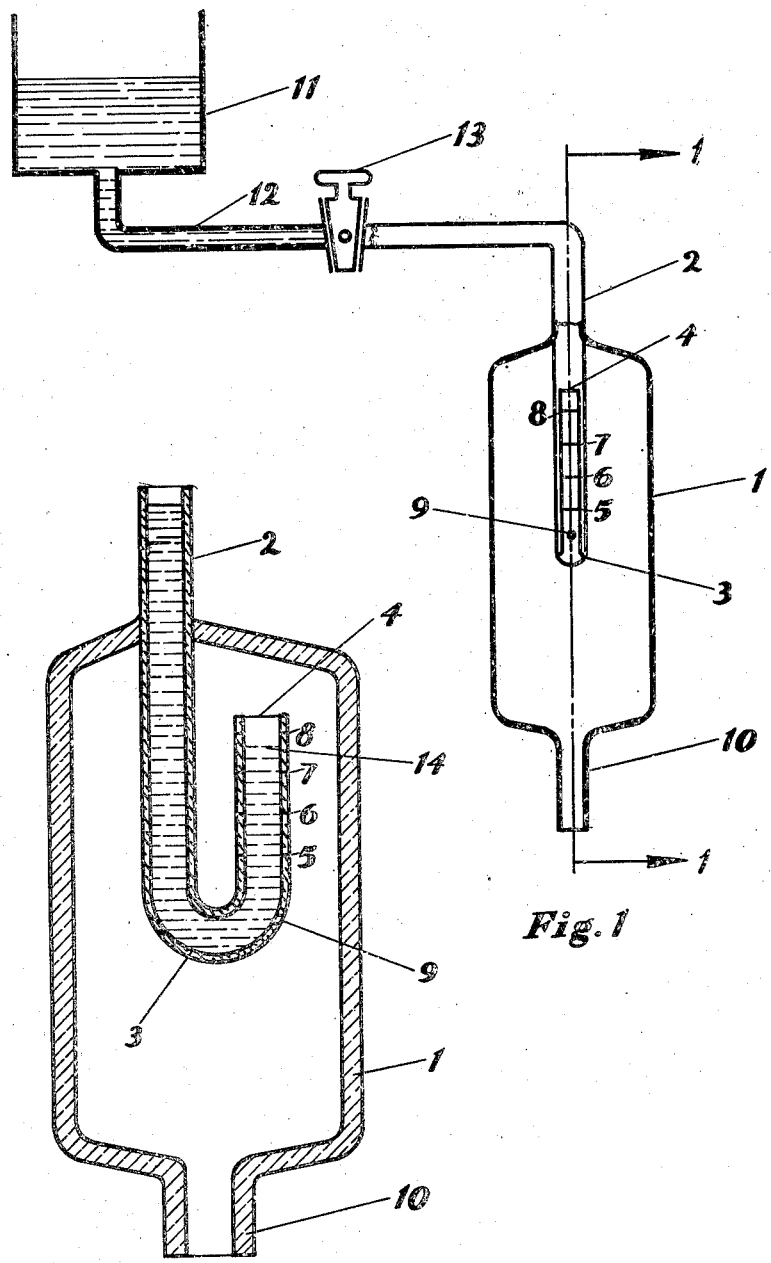
Figure 1 shows the flow gauge connected to a reservoir of liquid.
Figure 2 is a sectional view of the flow gauge along line 1—1 of Figure 1.

The flow gauge consists of a glass tubular body, portion 1. At the upper end, this body member is fused and securely sealed to glass inlet tube 2.

Tube 2, extending into the empty chamber of 1, is bent upward at 3. This upward extension to point 4 serves as the indicating part of the gauge.

Lines 5, 6, 7 and 8 are engraved in the glass, and form the scale of the gauge. Hole 9 serves as an orifice through which the liquid flows. The liquid leaves the gauge through exit tube 10.

The source of liquid is represented as stored in a glass reservoir 11, which is connected by glass tubing 12, to stopcock 13, which in turn is sealed to entrance tube 2.

The novel features of my invention will be understood from a description of its use. When stopcock 13 is opened a small amount of liquid flows into the gauge and rises a distance above hole 9. The distance between the free surface of the liquid 14, and hole 9, establishes a pressure head which causes liquid to flow out of hole 9. The rate of this flow is determined by the liquid head. This head can be readily read by observing the position of the liquid surface 14, with respect to the engraved lines 5, 6, 7 and 8.

The gauge is readily calibrated by setting the stopcock 13 so that the liquid level is maintained at one of the lines. The rate of flow can be readily determined by weighing the amount of liquid discharged through tube 10 over a measured period of time.

This calibration is, of course, repeated for each of the lines provided.

This invention forms a single and accurate apparatus for estimating the rate of liquid flow. The gauge can be used to measure the rate at which a reagent is added to a chemical mixture. It can also be used to indicate the rate at which medicinal preparations are injected into the blood stream.

In this last application the all glass construction is important, since such a device can be cleaned with strong reagents, and sterilized with steam.

I claim:

1. A gauge for measuring the rate of flow of liquids, comprising a transparent vitreous receiving chamber, a transparent vitreous supply tube in fused relation within said transparent vitreous receiving chamber, the delivery end of said supply tube being bent back upon itself, providing a change in direction of the flow of the liquid to be measured, said tube having an efflux orifice passing the entire discharge of said supply tube and situated a suitable distance up-stream with respect to the end of said supply tube, means on said supply tube for gauging the height of liquid above said orifice, means integral with the receiving chamber for permitting withdrawal of liquid from said receiving chamber, all adapted to be cleaned and sterilized by any suitable means, such as steam and chemicals.

2. A liquid flow gauge comprising a transparent receiving chamber, a transparent supply tube extending into the chamber adjacent the top thereof and sealed thereto and integrally united therewith, the supply tube being bent back upon itself within the chamber to provide a change in direction of flow of the liquid, said tube having an efflux orifice passing the entire discharge of said supply tube and located adjacent the bend where the change of direction of flow occurs, the portion of the tube on the downstream side of the orifice extending upwardly of the orifice and being open at the top to the atmosphere within the chamber, calibrated means on the portion of the tube on the downstream side of the orifice and visible through the chamber wall to indicate the head of the liquid on that side of the orifice, said receiving chamber having an opening at the bottom thereof for permitting the withdrawal of liquid therefrom.

DANIEL S. STEVENS.

REFERENCES CITED

The following references are of record in the file of this patent:

UNITED STATES PATENTS

| Number | Name | Date |
|---|---|---|
| 1,049,718 | Howard | Jan. 7, 1913 |
| 1,589,418 | Woidich | June 22, 1926 |

FOREIGN PATENTS

| Number | Country | Date |
|---|---|---|
| 108,711 | Great Britain | Aug. 14, 1917 |
| 398,490 | Great Britain | Sept. 7, 1933 |